Nov. 10, 1925.  1,561,043
R. C. ZUCKERMAN
POTATO CLEANER AND STERILIZER
Filed Oct. 8, 1924
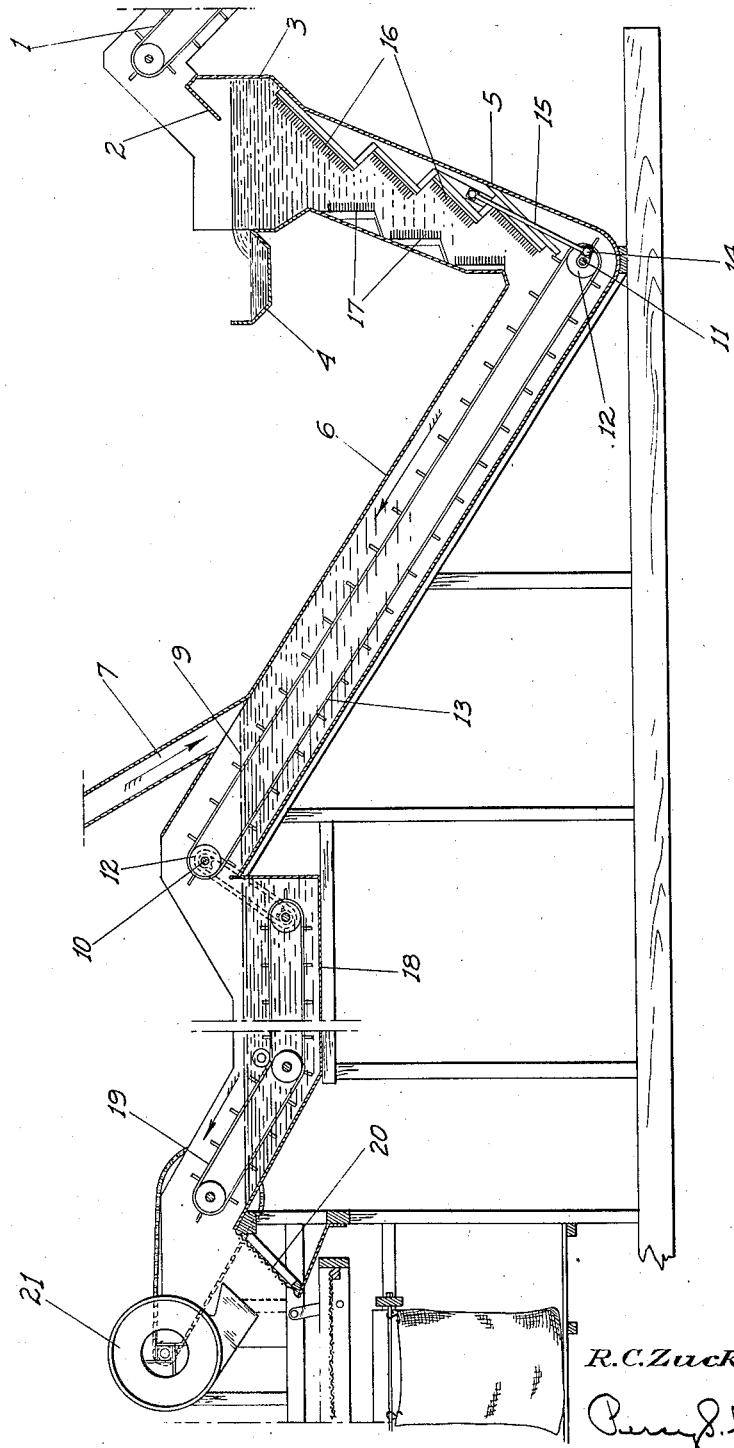
INVENTOR
R.C. Zuckerman
ATTORNEY Patented Nov. 10, 1925.

1,561,043

UNITED STATES PATENT OFFICE.

ROSCOE C. ZUCKERMAN, OF STOCKTON, CALIFORNIA.

POTATO CLEANER AND STERILIZER.

Application filed October 8, 1924. Serial No. 742,384.

*To all whom it may concern:*

Be it known that I, ROSCOE C. ZUCKERMAN, a citizen of the United States, residing at Stockton, county of San Joaquin, State of California, have invented certain new and useful Improvements in Potato Cleaners and Sterilizers; and I do declare the following to be a full, clear, and exact description of same, reference being had to the accompanying drawings, and to the characters of reference marked thereon, which form a part of this application.

This invention relates to the vegetable treating art. The particular object of the invention is to produce a device for cleaning and sterilizing potatoes.

Under the present practice potatoes are dug by machine in the field and although they are carried up over screen conveyors foreign matter, such as soil or the like, is not always removed therefrom. This is especially true in peat lands where the peat soil is lighter than the potatoes. It is customary therefore, after digging the potatoes, to discharge them upon the ground where they are picked up and sacked by hand to relieve them of the foreign matter such as soil and the like.

The aim of my invention is to allow potatoes, foreign matter, and all, to be loaded from the digging machines into vehicles and thereafter, by means of my improved apparatus, washed, dried, sterilized, graded and sacked. This will greatly reduce the cost and detail of handling the crop and the potatoes will be in much better final condition. I sterilize them to overcome the fungus disease which causes "leakers" which will often contaminate and rot a large quantity of the potatoes.

The above and other incidental objects I accomplish by means of a new and unique apparatus which I will now proceed to describe in detail.

The figure of the drawings is a longitudinal sectional view of the complete apparatus.

Referring now more particularly to the characters of reference on the drawings the numeral 1 designates a draper or conveyor by means of which the potatoes are conveyed on to the apparatus.

The potatoes are discharged down a chute 2 into a tank 3 through which is passing water under pressure, which water overflows into an outlet gutter 4.

An inclined conduit 5 leads from the tank 3 and connects with another oppositely inclined conduit 6. The conduit 6 has a water inlet 7 and its upper end is open above the normal water level 9 of the water within such conduit, all for a purpose as will presently appear.

Shafts 10 and 11 are journaled in the upper and lower ends, respectively, of the conduit 6. Power may be applied in any desired manner to such shafts whereby to drive sprockets 12 mounted thereon and operating a conveyor 13.

A crank 14 is secured on the lower shaft 11 and operates a pitman 15. The motion of the pitman operates a stepped reciprocating scrubbing brush element 16 operating along one side of the conduit 5. A similar stationary scrubbing brush element 17 is mounted along the opposite side of the conduit 5 in spaced relation with respect to the element 16.

The potatoes from the conveyor 1 discharge into the tank 3 and pass in a continuous stream between the brush elements 16 and 17. The action of the latter loosens dirt or other foreign matter therefrom, and the same is carried by the flow of the water into the drain off trough and then to any point desired.

The scrubbed potatoes pass from the conduit 5 onto the conveyor 13. This carries them through the clear flowing water to insure perfect cleanliness. The stream of potatoes passes out of the water at the level 9 and are then discharged through the open end 8, at the conduit 6, into a tank or other receptacle 18 of any desired shape. This tank will contain any known sterilization agent of such character as to kill the fungus on the potatoes but not affect the food qualities thereof.

The potatoes are carried from the tank 18 by a conveyor 19. They are then discharged over a slide 20 where they are subjected to a drying air blast from a blower 21. When thoroughly dry they are graded, sacked or otherwise handled as may be found desirable.

In the case of potatoes dug in peat land, lumps of peat, sometimes as large as the potatoes themselves, are passed into the tank 3 with the potatoes. The peat is spongy, and while it will not dissolve in the water like ordinary dirt, will float, and the lumps will therefore be immediately carried from the tank into the gutter by the action of the flowing water.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An apparatus for the purpose described including an inclined and enclosed conduit, scrubbing elements therein, a second enclosed conduit connected therewith at the reverse inclination, and a conveyor in the second conduit discharging from the upper end thereof.

2. In an apparatus for the purpose described a means for scrubbing potatoes, a means for washing the potatoes as they are scrubbed, a sterilizing means and a dryer.

3. A potato cleaner including a conduit into one end of which the potatoes are fed, scrubbing elements in the conduit, means whereby the potatoes will move from one end of the conduit to the other, and means for providing a flow of water through the conduit in a direction opposite but parallel to the movement of the potatoes therethrough whereby to cause any foreign matter initially with the potatoes to be separated therefrom by the time the potatoes reach the end of the conduit farthest from the feeding end.

4. A potato cleaner including an inclined and enclosed conduit into the upper end of which the potatoes are fed, scrubbing elements in the conduit, and means for providing a flow of water from the lower to the upper end of the conduit.

5. A potato cleaner including an inclined and enclosed conduit into the upper end of which the potatoes are fed, scrubbing elements in the conduit, means for providing a flow of water from the lower to the upper end of the conduit, and an overflow gutter at the upper end of the conduit, whereby any floatable matter dumped into the conduit with the potatoes will at once be carried off.

6. A potato cleaner including a conduit into one end of which the potatoes are fed, and scrubbing elements disposed in the conduit and arranged for relatively reciprocating movement, the conduit being inclined whereby the potatoes will tend to move of themselves from one end of the conduit to the other and with such movement will have a reciprocating rotary movement imparted thereto by the action of the scrubbing elements.

7. A potato cleaner including an inclined and enclosed conduit into the upper end of which the potatoes to be cleaned are fed, scrubbing elements in said conduit, a similar conduit connected to the first conduit at its lower end and leading upwardly therefrom with a reverse inclination, conveying means in the second conduit to take the potatoes from below the scrubbing elements and discharge them from the top of the second conduit, and means for providing a flow of water through the conduits from the top of the second conduit to the top of the first conduit, whereby any foreign matter initially with or removed from the potatoes will be positively segregated therefrom by the time the potatoes reach the top of the second conduit.

8. A potato cleaner including a conduit into one end of which the potatoes are fed, scrubbing elements in the conduit, means whereby the potatoes will move from one end of the conduit to the other, said conduit being adapted to be filled with water, and means whereby as the potatoes move toward the discharge end of the conduit any foreign matter previously associated with the potatoes will move in the opposite direction.

9. In an apparatus for the purpose described, a means for cleaning potatoes with the aid of a liquid, means for withdrawing the potatoes out of the liquid, means for then drying the potatoes, and a grading and sacking mechanism to which the potatoes immediately pass upon being dried.

10. A potato cleaner including a conduit into one end of which the potatoes are fed, scrubbing elements in the conduit, means whereby the potatoes will move from one end of the conduit to the other, and a water supply member discharging directly into the conduit at the end thereof to which the potatoes move, whereby the latter after being scrubbed are subjected to the washing influence of the fresh incoming water.

In testimony whereof I affix my signature.

ROSCOE C. ZUCKERMAN.